US008744413B2

(12) United States Patent
Kwon

(10) Patent No.: US 8,744,413 B2
(45) Date of Patent: Jun. 3, 2014

(54) MOBILE TERMINAL AND METHOD FOR DISPLAYING STANDBY SCREEN ACCORDING TO ANALYSIS RESULT OF USER'S BEHAVIOR

(75) Inventor: Do Hun Kwon, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1540 days.

(21) Appl. No.: 11/653,784

(22) Filed: Jan. 16, 2007

(65) Prior Publication Data

US 2007/0298843 A1 Dec. 27, 2007

(30) Foreign Application Priority Data

Jun. 26, 2006 (KR) .................. 10-2006-0057394

(51) Int. Cl.
*H04M 3/42* (2006.01)
*H04W 24/00* (2009.01)

(52) U.S. Cl.
USPC .................................. 455/414.1; 455/456.3

(58) Field of Classification Search
USPC ............... 455/414.1–414.4, 456.1–457, 566, 455/575.3–575.4
See application file for complete search history.

(56) References Cited

U.S. PATENT DOCUMENTS

| 7,574,661 | B2 | 8/2009 | Matsuura et al. | |
| 7,634,299 | B2 * | 12/2009 | Mise et al. | 455/567 |
| 8,483,675 | B2 * | 7/2013 | Chung et al. | 455/418 |
| 2003/0093370 | A1 * | 5/2003 | Choi | 705/39 |
| 2004/0014485 | A1 * | 1/2004 | Sugauchi et al. | 455/550.1 |
| 2005/0054381 | A1 | 3/2005 | Lee et al. | |
| 2005/0143916 | A1 * | 6/2005 | Kim et al. | 701/214 |
| 2006/0141990 | A1 * | 6/2006 | Zak et al. | 455/412.1 |
| 2009/0088179 | A1 * | 4/2009 | Stuempert et al. | 455/456.1 |

FOREIGN PATENT DOCUMENTS

| JP | 2005-198345 | 7/2005 |
| KR | 1020050025222 | 3/2005 |
| KR | 1020060019008 | 3/2006 |
| KR | 1020060057411 | 5/2006 |

* cited by examiner

*Primary Examiner* — George Eng
*Assistant Examiner* — Nam Huynh
(74) *Attorney, Agent, or Firm* — The Farrell Law Firm, P.C.

(57) ABSTRACT

A mobile terminal includes an input unit for receiving a command input by a user; a location information generator for generating location information on the mobile terminal; a time counter; a storage unit having a command processing information table and a standby screen display information table; and a control unit for analyzing the user's behavior by using command processing information stored in the command processing information table, storing the result of the behavior analysis in the standby screen display information table, and displaying a standby screen according to the result of the behavioral analysis with respect to the current location of the mobile terminal and the current time. Accordingly, using a history of the mobile terminal use provides an advantage of improved user convenience by predicting and actively reacting to a user's manner of using the mobile terminal.

26 Claims, 7 Drawing Sheets

| COMMAND CODE | TYPE OF COMMAND | DATE | DAY | TIME | LOCATION |
|---|---|---|---|---|---|
| 0002 | TRANSMIT CHARACTER MESSAGE | 20060601 | THURSDAY | 08:00:00 | HOME |
| 0003 | START WATCHING DMB | 20060601 | THURSDAY | 08:10:00 | SUBWAY STATION 1 |
| 0004 | END WATCHING DMB | 20060601 | THURSDAY | 08:40:00 | COMPANY |
| 0007 | CHANGE TO VIBRATION | 20060601 | THURSDAY | 08:45:00 | COMPANY |
| 0005 | START LISTENING TO MP3 | 20060601 | THURSDAY | 12:30:00 | COMPANY |
| 0006 | END LISTENING TO MP3 | 20060601 | THURSDAY | 12:50:00 | COMPANY |
| 0008 | CHANGE TO RING MODE | 20060601 | THURSDAY | 18:30:00 | SUBWAY STATION 2 |
| 0009 | REMOTE CONTROL MODE | 20060601 | THURSDAY | 20:00:00 | HOME |
| 0010 | ALARM SETTING | 20060601 | THURSDAY | 22:00:00 | HOME |
| 0003 | START WATCHING DMB | 20060602 | FRIDAY | 08:10:00 | SUBWAY STATION 1 |
| 0004 | END WATCHING DMB | 20060602 | FRIDAY | 08:40:00 | COMPANY |
| 0007 | CHANGE TO VIBRATION MODE | 20060602 | FRIDAY | 08:45:00 | COMPANY |
| 0008 | CHANGE TO RING MODE | 20060602 | FRIDAY | 18:30:00 | SUBWAY STATION 2 |
| ⋮ | ⋮ | ⋮ | ⋮ | ⋮ | ⋮ |

| TIME | DAYS | LOCATION | STANDBY SCREEN DISPLAY INFORMATION |
|---|---|---|---|
| 08:10:00 | MONDAY ~ FRIDAY | SUBWAY STATION 1 | DMB FUNCTION SELECTION MENU |
| 08:40:00 | MONDAY ~ FRIDAY | COMPANY | DMB FUNCTION SELECTION MENU |
| 08:45:00 | MONDAY ~ FRIDAY | COMPANY | MESSAGE FOR CHANGING TO VIBRATION MODE |
| 18:30:00 | MONDAY ~ FRIDAY | SUBWAY STATION 2 | MESSAGE FOR CHANGING TO RING MODE |
| ⋮ | ⋮ | ⋮ | ⋮ |

MOBILE TERMINAL AND METHOD FOR DISPLAYING STANDBY SCREEN ACCORDING TO ANALYSIS RESULT OF USER'S BEHAVIOR

PRIORITY

This application claims priority under 35 U.S.C. §119 from Korean Patent Application No. 2006-0057394, which was filed in the Korean Intellectual Property Office on Jun. 26, 2006, the contents of which are incorporated herein by reference.

BACKGROUND OF THE INVENTION

1. Field of the Invention

The present invention relates to a mobile terminal, and particularly, to a mobile terminal operating according to the result of a user's behavioral analysis, and method thereof.

2. Description of the Prior Art

With rapid growth in the communication industry, mobile communication systems are developing multicasting and multimedia communication capabilities enabling transmission of large scale data in addition to voice communication.

In this context, developments in mobile terminals continue to perform similar functions as the personal computer, and are able to support various functions such as character transmission and image transmission, in addition to the voice communication. In the meantime, use of mobile terminals is rapidly increasing and thereby user's reliance on the mobile terminal is also increasing.

For example, users utilize the mobile terminal as an electronic pocketbook by storing addresses, schedules and memos in the mobile terminal, or as an alarm clock by using an alarm or morning-call function of the mobile terminal. Additionally, the mobile terminal may be used as a transport card or remote controller by adding the corresponding functions to the mobile terminal. Further, with recent development in home network technology, the mobile terminal may control various home electronic instruments connected to a home network.

As described above, with diversification of the functions of the mobile terminal, users utilize the mobile terminals in much of their daily life, and therefore the mobile terminal is fast becoming an inseparable tool.

Most people live a relatively regular life pattern, and therefore a user's normal life pattern relating to the use of the mobile terminal can be predicted by collecting history of using the mobile terminal. Additionally, with development in position tracking technology, prediction of a user's behavioral pattern at a specific location has been enabled.

However, the conventional mobile terminal is an electronic instrument passively operating according to a user' command, and cannot actively react to the user's behavior or life pattern.

SUMMARY OF THE INVENTION

The present invention has been made in view of the above problems, and an object of the present invention is to provide user convenience in using a mobile terminal and an operating method thereof, by predicting a user's normal life pattern relating to the use of the mobile terminal and thereby actively reacting according to historical information on the use of the mobile terminal.

Another object of the present invention is to provide a mobile terminal displaying a standby screen according to the result of a behavioral analysis of the user.

In order to achieve the above objects, a mobile terminal according to the present invention includes an input unit for receiving a command input by a user; a location information generator for generating location information on the mobile terminal; a time counter; a storage unit having a command processing information table and a standby screen display information table, wherein, if a command is input through the input unit, the command processing information table receives the current location of the mobile terminal from the location information generator and the current time from the time counter, and stores command processing information including the command, the current location, and the current time, and the standby screen display information table stores standby screen display information corresponding to the current location of the mobile terminal and the current time according to command processing information stored in the command processing information table; and a control unit for analyzing the user's behavior by using command processing information stored in the command processing information table during a predetermined period for collecting behavior analysis information, storing the result of the behavior analysis in the standby screen display information table, and displaying a standby screen according to the result of the behavioral analysis with respect to the current location of the mobile terminal and the current time.

After storing the result of the behavioral analysis, the control unit preferably re-analyzes the user's behavior by using command processing information additionally stored in the command processing information table, and updates the result of the behavioral analysis according to the result of the re-analysis.

The control unit preferably generates a standby screen display information table including the location and time of a command input, and screen display information required for the selection of the command with respect to the behavioral analysis information repeated more than a predetermined number of times at the same location and time, out of the command processing information stored in the command processing information table.

Preferably, the location information generator receives location data from a base station of an area in which the mobile terminal is located, and generates the current location information on the mobile terminal by using the location data.

Preferably, the location information generator includes a GPS receiver for receiving GPS data from GPS satellites, and generates the current location information on the mobile terminal by using the GPS data.

Preferably, the location information generator includes a radio frequency identification tag reader for retrieving information from a radio frequency identification tag including location information, and installed at a corresponding location, and generates the current location information on the mobile terminal by using the radio frequency identification tag information.

Preferably, the control unit detects standby screen display information corresponding to the current location of the mobile terminal and the current time, and displays a standby screen in response to the user's command for displaying the standby screen.

A method for displaying a standby screen according to the present invention includes collecting behavioral information on the mobile terminal user during a predetermined period; generating a standby screen display information table for storing standby screen display information for individual situations according to the collected behavioral information; identifying the current location of the mobile terminal and the current time; checking whether the standby screen display information corresponding to the current location and time exists in the standby screen display information table; and displaying a standby screen if the corresponding standby screen display information exists in the standby screen display information table.

Preferably, the method further includes, after the step of generating the standby screen display information table, updating the standby screen display information table according to an input command and operation result.

The step of updating the standby "screen display" information table preferably includes performing a corresponding operation in response to a command; generating the current location information on the mobile terminal; identifying the time of the command input; adding command processing information including the input command, the current location information, and the time of the command input to the behavioral analysis information; and updating the standby screen display information table according to the behavioral analysis information.

The step of collecting the behavioral analysis information preferably includes performing a corresponding operation in response to a command; generating current location information on the mobile terminal; identifying the time of the command input; and storing command processing information including the input command, the current location information, and the time of the command input, according to the type of the command.

Preferably, in the step of generating a standby screen display information table, including the location and time of a command input and screen display information required for selection of the command, the standby screen display information table is generated with respect to behavioral analysis information repeated more than a predetermined number of times at the same location and time, out of the collected user's behavioral information.

The step of identifying the current location and the current time preferably includes generating the current location information by using location data received from a base station of an area in which the mobile terminal is located, GPS data, or radio frequency identification tag information.

Preferably, in the step of displaying the standby screen, a user's operational signal is received to display the standby screen.

BRIEF DESCRIPTION OF THE DRAWINGS

The above and other objects, features and advantages of the present invention will become more apparent from the following detailed description in conjunction with the accompanying drawings, in which:

FIG. 2 shows a command processing information table for analyzing user's behavior in the mobile terminal;

FIG. 3 shows a standby screen display information table in the mobile terminal;

DETAILED DESCRIPTION OF PREFERRED EMBODIMENTS

Figure 1:
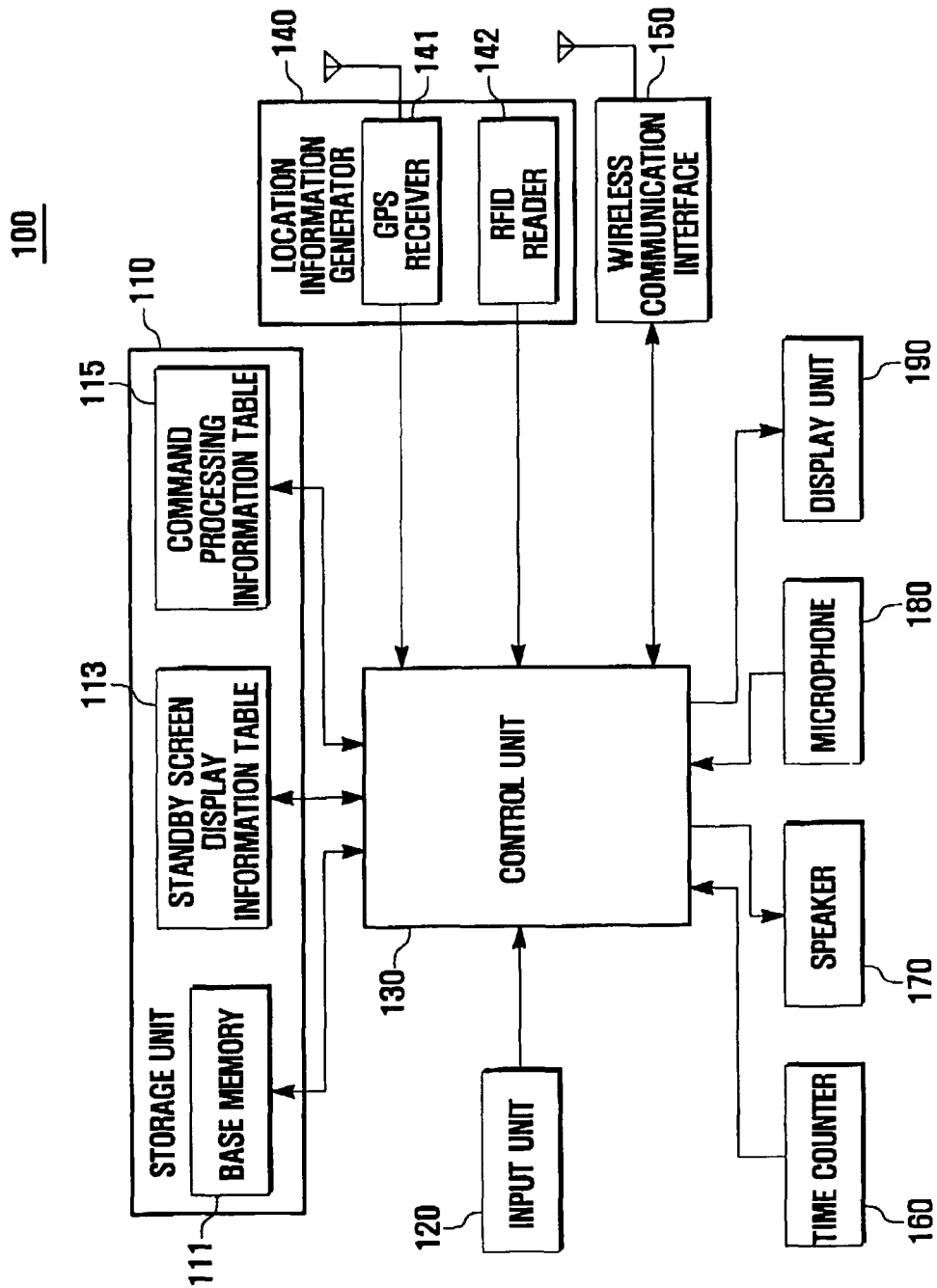
FIG. 1 is a block diagram showing a typical configuration of a mobile terminal according to the present invention.

Hereinafter, preferred embodiments of the present invention are described in detail with reference to the accompanying drawings. The same reference numbers are used for the same or like components in the drawings. Additionally, detailed explanations for well-known functions and compositions may be omitted to avoid obscuring the subject matter of the present invention.

Referring to FIG. 1, the mobile terminal 100 according to the present invention includes a storage unit 110, input unit 120, control unit 130, location information generator 140, wireless communication interface 150, time counter 160, speaker 170, microphone 180, and display unit 190.

The storage unit 110 stores information related to the operation of the mobile terminal 100, such as drive programs for system drive control and data related to the programs. The storage unit 110 preferably includes a base memory 111 for storing basic information related to the operation of the mobile terminal, a standby screen display information table 113 for storing standby screen display information corresponding to situations, and a command processing information table 115 for storing location and time information corresponding to input commands.

In particular, the standby screen display information table 113 stores standby screen display information corresponding to the location of the mobile terminal and time, according to command processing information stored in the command processing information table 115. For this, the standby screen display information table 113 preferably stores screen display information required for the selection of the command, with respect to behavioral analysis information repeated more than a predetermined number of times at the same location and time, out of the command processing information stored in the command processing information table 115.

Additionally, if a command is input through the input unit 120, the command processing information table 115 preferably receives the current location of the mobile terminal 100 from the location information generator 140 and the current time from the time counter 160, and stores command processing information including the command, the current location, and the current time.

Exemplary structures of the standby screen display information table 113 and command processing information table 115 are shown in FIGS. 2 and 3, and the details are described later.

The input unit 120 configured with a keypad (not shown) receives a key input signal, and provides a user interface for the control of the mobile terminal 100. The input unit 120 preferably receives a command selected by the user and transmits the command to the control unit 130.

The control unit 130 controls the operation of the mobile terminal 100 according to a signal input through the input unit 120 and an operation program pre-stored in the base memory 111. In particular, the control unit 130 analyzes the user's behavior by using command processing information stored in the command processing information table 115 during a predetermined period for collecting behavioral analysis information, stores the result of the analysis in the standby screen display information table 113, and displays a standby screen according to the result of the analysis with respect to the current location of the mobile terminal and the current time.

Before displaying a corresponding standby screen, the control unit 130 preferably receives a user's operational signal (for example, a key input, sliding operation in a sliding type mobile phone, and opening a folder in a folder type mobile phone) for the display of the screen display. That is, the control unit 130 preferably displays the standby screen corresponding to the current location of the mobile terminal 100 and the current time in response to the user's operational signal.

Additionally, the control unit 130 preferably re-analyzes the user's behavior by using command processing information added to the command processing information table 115 after storing the result of the analysis, and updates the standby screen display information table 113 according to the result of the re-analysis.

The location information generator 140 generates location information on the mobile terminal 100. In particular, the location information generator 140 receives location data from an external device, and generates location information on the mobile terminal 100 by using the location data. The external device transmitting the location data to the location information generator 140 is preferably one of a base station of an area in which the mobile terminal 100 is located, a GPS satellite, and a radio frequency identification tag (RFID) including location information. That is, the location information generator 140 receives location data from a base station of an area in which the mobile terminal 100 is located and generates location information of the mobile terminal 100 by using the location data. For this, the location information generator 140 preferably includes, as shown in FIG. 1, at least one of a GPS receiver 141 and/or a radio frequency identification tag reader 142.

The wireless communication interface 150 interfaces with a wireless communication network, and transmits/receives data to/from the wireless communication network according to the control of the control unit 130.

The time counter 160 measures current time and transmits the result of the measurement to the control unit 130.

The speaker 170 outputs sound signals from the control unit 130, and the microphone 180 transmits sound signals (for example, a user's voice) to the control unit 130.

The display unit 190 outputs image signals, and displays the operational status of the mobile terminal 100. In particular, the display unit 190 displays a standby screen corresponding to the location of the mobile terminal 100 and the current time.

FIG. 2 shows the command processing information table for analyzing user's behavior in the mobile terminal. Referring to FIGS. 1 and 2, the command processing information table 115 stores information including a command code, type of command, and processed date, day, time, and location, according to the types of commands input through the input unit 120. Referring to FIG. 2, 009 command input on Jun. 1, 2006 and 005 command input on Jun. 1, 2006 are stored in the command processing information table 115.

Referring to FIG. 3, the standby screen display information table 113 stores the result of user's behavioral analysis according to the command processing information table 115 shown in FIG. 2. FIG. 2 shows that the command 'Start watching DMB' corresponding to command code '0003' is repeated at 08:10:00 on Jun. 1, 2006, Thursday and Jun. 2, 2006, Friday, at 'Subway station 1'; the command 'End watching DMB' corresponding to command code '0004' is repeated at 08:40:00 on Jun. 1, 2006, Thursday and Jun. 2, 2006, Friday, at 'Company'; the command 'Change to vibration mode' corresponding to command code '0007' is repeated at 08:45:00 on Jun. 1, 2006, Thursday and Jun. 2, 2006, Friday, at 'Company'; and the command of 'Change to ring mode' corresponding to command code '0008' is repeated at 18:30:00 on Jun. 1, 2006, Thursday and Jun. 2, 2006, Friday, at 'Subway station 2'.

Accordingly, the control unit 130 generates a standby screen display information table 113 as shown in FIG. 3 by using the repeated command processing information, and controls display of the standby screen of the mobile terminal 100 according to the contents of the standby screen display information table 113.

For example, if the mobile terminal 100 identifies that the current location is 'Company' at 08:45:00 on Monday, the control unit 130 displays 'Message for changing to vibration mode' on the standby screen according to the standby "screen display" information table 113 shown in FIG. 3. Alternatively, the control unit 130 may display 'Menu for changing to vibration mode' on the standby screen. That is, the control unit 130 controls the display of the standby screen so that the user may easily change the mode of the mobile terminal 100 to an vibration mode, because the user repeatedly changed the mode of the mobile terminal 100 to an vibration mode at 08:45:00 at the company.

FIG. 3 shows an example in which the standby screen display information table 113 includes command information by the time and location, and the time is indicated as a specific time. However, the present invention is not limited to the example in FIG. 3.

Figure 4:
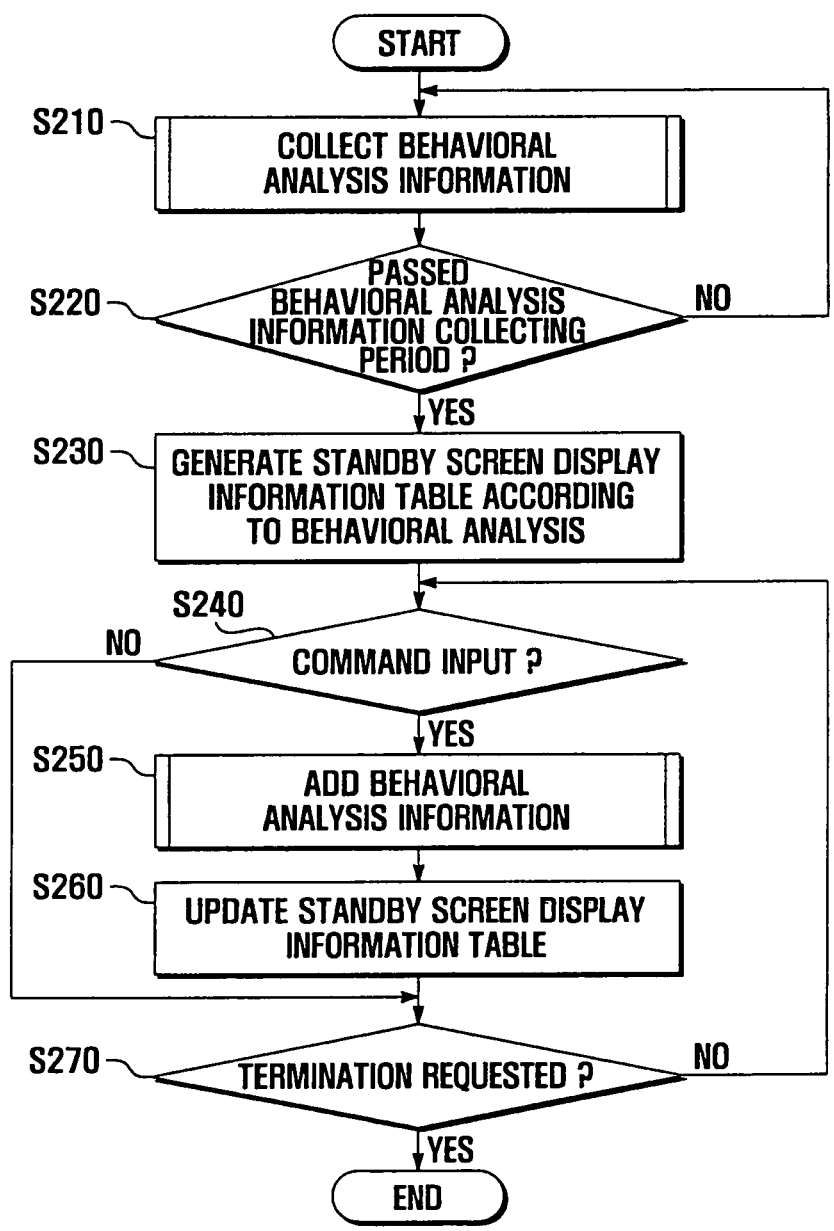
FIG. 4 is a flow chart showing the steps of analyzing user's behavior and processing the result in the mobile terminal.
Figure 5:
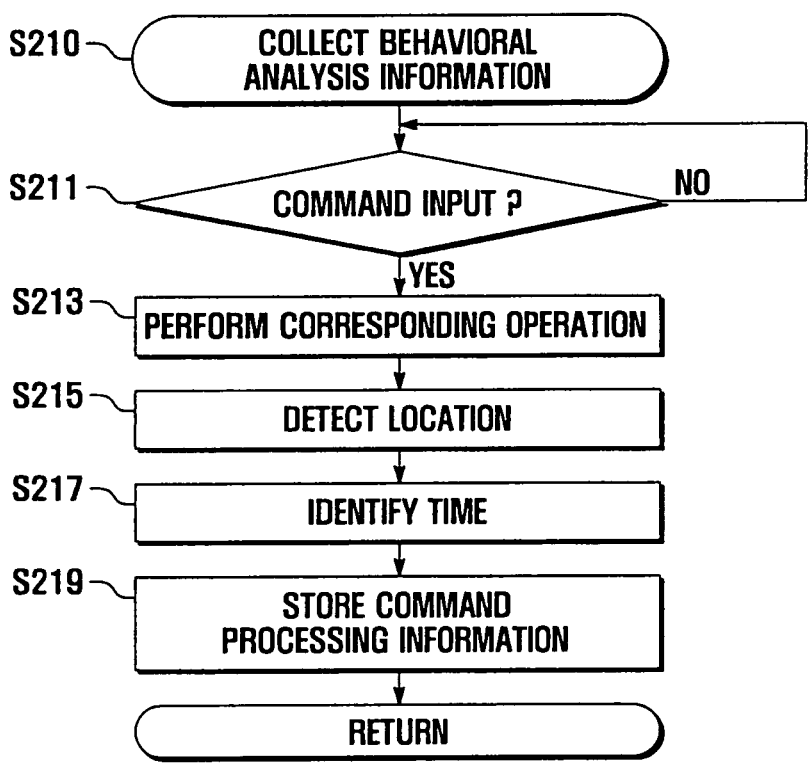
FIG. 5 is a flow chart showing the step of collecting behavioral information.
Figure 6:
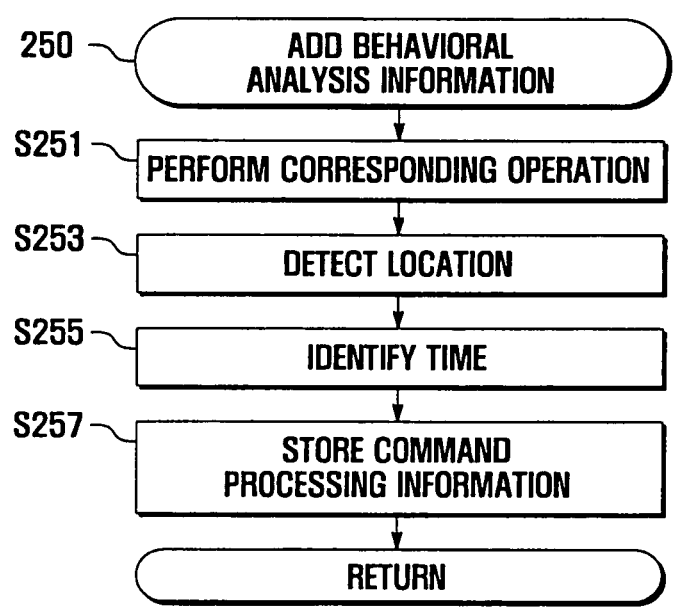
FIG. 6 is a flow chart showing the steps of adding behavior analysis information.
Figure 7:
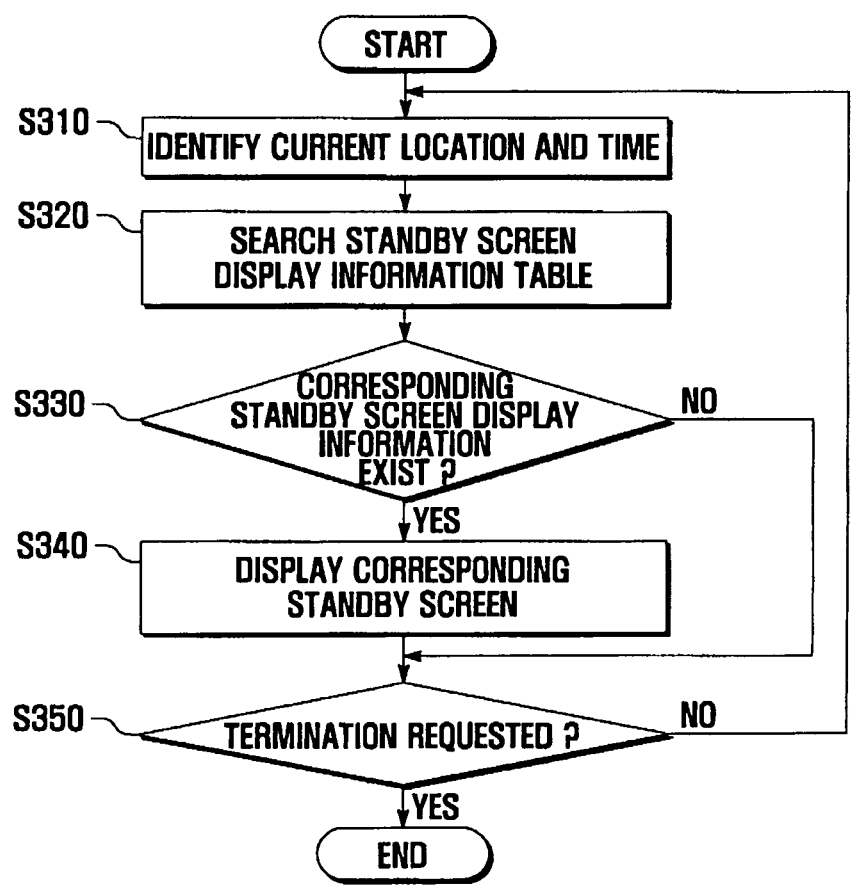
FIG. 7 is a flow chart showing the steps of operating the mobile terminal, according to the result of the behavioral analysis.

FIGS. 4 to 7 show examples of standby screen display methods for the mobile terminal. FIGS. 4 to 6 are flow charts showing the steps of analyzing user's behavior and managing the results by using the mobile terminal. FIG. 7 is a flow chart showing the steps of displaying a standby screen according to the result of the behavioral analysis by using the mobile terminal.

Referring to FIG. 4, the steps of analyzing user's behavior and processing the result by using the mobile terminal is described as follows.

First, the control unit collects behavioral data on the mobile terminal user for a predetermined period (S210 and S220). The data is preferably command processing information including time and location information on the command input through the mobile terminal 100 corresponding to the type of the command. Detailed steps of collecting information will be described later in more detail.

Subsequently, after steps S210 and S220, the control unit 130 generates a standby screen display information table 113 according to the collected information (S230). For this, the control unit 130 preferably uses command processing information included in the command processing information table 115 that is generated in step S210. That is, the control unit 130 preferably generates a standby screen display information table 113 with respect to behavioral analysis information repeated more than a predetermined number of times at the same location and time, out of the collected user's behavioral information from the command processing information table 115 including the location and time of a command input and screen display information required for the selection of the command.

After generating the standby screen display information table 113, if a command is input (S240), the control unit 130 adds the input command processing information (i.e. behavioral analysis information) (S250), and updates the standby screen display information table 113 according to the behavioral analysis information including the new command processing information (S260).

The above steps S240 to S260 are repeated until termination is requested (S270).

Referring to FIGS. 1 and 5, if a command is input through the input unit 120 (S211), the control unit 130 performs the corresponding operation (S213). Subsequently, the control unit 130 generates location information on the mobile terminal 100 at the time of the command input (S215), and identifies the time of the command input (S217). Subsequently, command processing information including the command, location information, and time of the command input, is stored as the behavioral analysis information according to the type of command (S219).

The step S215 of generating the location information preferably receives location data from an external device, and generates location information on the mobile terminal 100 by using the location data. Referring to FIGS. 1 and 6, the step of adding behavioral analysis information (S250), an operation corresponding to the command input in step S240 is performed (S251). Subsequently, location information on the mobile terminal 100 is generated at the time of the command input (S253), and the time of the command input is identified (S255). Subsequently, command processing information including the command, location information, and time of the command input, is stored as the behavior analysis information according to the type of command (S257). Detailed description on step S253 is omitted, because this step is similar to step S215 of FIG. 5.

Referring to FIGS. 1 and 7, the operational steps are described as follows.

First, the control unit 130 identifies the current location of the mobile terminal and the current time by receiving the current location information on the mobile terminal 100 from the location information generator 140 and the current time from the time counter 160 (S310). Subsequently, the control unit 130 searches the standby screen display information table 113 generated in the steps of FIGS. 4 to 6 (S320). That is, the control unit 130 checks whether standby screen display information corresponding to the current location and time identified in step S310 exists in the standby screen display information table 113.

According to the result of searching in step S320, if the corresponding standby screen display information exits (S330), the control unit 130 displays a corresponding standby screen (S340). Preferably, if the control unit 130 receives a user's standby screen display command (for example, a key input, sliding operation in a slide type mobile phone, and opening a folder in a folder type mobile phone), the control unit 130 prepares the standby screen corresponding to the current location of the mobile terminal 100 and the current time, and displays the standby screen.

The steps from S310 to S340 are repeated until a request for termination is input (S350).

In the step of identifying the current location and time (S310), the current location information on the mobile terminal 100 is preferably generated according to the step S215 of generating location information of FIG. 5 and the step S253 of generating location information of FIG. 6. Preferably, location data of the communication terminal 100 is received from one of a base station of an area in which the mobile terminal 100 is located as explained above.

As described above, a mobile terminal and a method for displaying a standby screen according to the present invention provide a user with more convenient command input by displaying a standby screen corresponding to the current location of the mobile terminal, the current time, and the result of the behavioral analysis of the user. Additionally, using the history of the mobile terminal use, the present invention provides an advantage of improved user convenience by predicting and actively reacting to a user's life pattern related to the use of the mobile terminal. Although exemplary embodiments of the present invention have been described in detail hereinabove, it should be understood by an artisan of ordinary skill in the art that variations and/or modifications of the basic inventive concept herein described may be made without departing from the spirit and scope of the present invention as further defined in the appended claims.

I claim:

1. A method for generating a standby screen table in a mobile terminal, the method comprising:
   collecting behavioral information of a user of the mobile terminal during a predetermined period;
   generating a command processing information table comprising the behavioral information, the behavioral information including command type information associated with a time, a day, and a location; and
   generating a standby screen display information table for storing standby screen display information, being displayed if a user's operational signal for the display of the standby screen is input, for individual situations based on the command processing information table,
   wherein the command type information comprises a first command type for executing a function of the mobile terminal and a second command type for finishing a function that is currently being executed, and
   wherein each command type information is identified by a command code that represents a particular type of command, time, and location.

2. The method of claim 1, further comprising, after the step of generating a standby screen display information table,
   analyzing the behavioral information using an additionally input command; and
   updating the standby screen display information table according to the result of the analysis.

3. The method of claim 2, wherein updating the standby screen display information table comprises:
   performing a corresponding operation in response to a command;
   generating current location information on the mobile terminal;
   identifying the time of the command input;
   adding command processing information including the input command, the current location information, and a time of the command input, to the analyzed behavioral information; and
   updating the standby screen display information table according to the collected behavioral analysis information.

4. The method of claim 1, wherein collecting the behavior analysis information further comprises:
   performing a corresponding operation in response to a command;
   generating current location information on the mobile terminal;
   identifying a time of a command input; and
   storing command processing information including the input command, the current location information, and the time of the command input, according to a type of the command.

5. The method of claim 1, wherein, the standby screen display information table, including a location and time of a command input and screen display information required for selection of the command, is generated from the collected behavioral information repeated more than a predetermined number of times at a same location and time.

6. The method of claim 4, wherein generating current location information on the mobile terminal further comprises:

receiving location data from a base station of an area in which the mobile terminal is located; and generating the current location information on the mobile terminal using the location data.

7. The method of claim 4, wherein generating the current location information on the mobile terminal comprises:

receiving GPS data from GPS satellites; and generating the current location information on the mobile terminal using the GPS data.

8. The method of claim 4, wherein generating the current location information on the mobile terminal comprises:

reading information from a radio frequency identification tag, including location information, installed at a corresponding location; and generating the current location information on the mobile terminal using the radio frequency identification tag information.

9. A mobile terminal comprising:

an input unit for receiving a command input by a user;

a location information generator for generating location information on the mobile terminal;

a time counter;

a storage unit for storing (a) a command processing information table comprising behavioral information including command type information associated with a time, a day, and a location, and (b) a standby screen display information table for storing standby screen display information, being displayed if a user's operation signal for the display of the standby screen is input, for individual situations, the standby screen display information table being based on an instruction information storing table; and a control unit for collecting the behavioral information of the user based on the command processing information table and for storing an analyzed result in the standby screen display information table, wherein the command type information comprises a first command type for executing a function of the mobile terminal and a second command type for finishing a function that is currently being executed, and wherein each command type information is identified by a command code that represents a particular type of command, time, and location.

10. The mobile terminal of claim 9, wherein the control unit analyzes the behavioral information using command processing information additionally stored in the command processing information table, and updates the result of the behavior analysis according to the result of the analysis, after storing the result of the behavior analysis.

11. The mobile terminal of claim 9, wherein the control unit generates the standby screen display information table including the location and time of a command input, and screen display information required for the selection of the command from the command processing information stored in the command processing information table with respect to behavioral analysis information repeated more than a predetermined number of times at the same location and time.

12. The mobile terminal of claim 9, wherein the location information generator receives location data from a base station of an area in which the mobile terminal is located, and generates the current location information on the mobile terminal using the location data.

13. The mobile terminal of claim 9, wherein the location information generator includes a GPS receiver for receiving GPS data from GPS satellites, and generates the current location information on the mobile terminal using the GPS data.

14. The mobile terminal of claim 9, wherein the location information generator includes a radio frequency identification tag reader for retrieving information from a radio frequency identification tag including location information installed at a corresponding location, and generates the current location information on the mobile terminal using the radio frequency identification tag information.

15. A method for displaying a standby screen in a mobile terminal, the method comprising:

detecting that a user's operation signal for the display of the standby screen is input;

checking a current location of the mobile terminal and a current time in response to the detection;

identifying a standby screen display information corresponding to the current location and the current time in a standby screen display information table; and displaying the identified standby screen information, wherein the standby screen display information table is generated based on a command processing information table comprising behavioral information, collected during a predetermined period, including command type information associated with a time, a day, and a location, wherein the command type information comprises a first command type for executing a function of the mobile terminal and a second command type for finishing a function that is currently being executed, and wherein each command type information is identified by a command code that represents a particular type of command, time, and location.

16. The method of claim 15, wherein checking the current location and current time comprises checking the current time after checking the current location of the mobile terminal.

17. The method of claim 15, wherein checking the current location and current time comprises:

receiving location data from a base station of an area in which the mobile terminal is located; and generating the current location information on the mobile terminal using the location data.

18. The method of claim 15, wherein checking the current location and current time comprises:

receiving GPS data from GPS satellites; and generating the current location information on the mobile terminal using the GPS data.

19. The method of claim 15, wherein checking the current location and current time comprises:

reading information from a radio frequency identification tag, including location information, installed at a corresponding location; and generating the current location information on mobile terminal using the radio frequency identification tag information.

20. The method of claim 15, wherein displaying the identified standby screen information comprises:

receiving a user operational input signal for displaying the standby screen; and displaying the standby screen according to the user operational input signal.

21. A mobile terminal comprising:

an input unit for receiving a command input by a user;

a location information generator for generating location information on the mobile terminal;

a time counter;

a storage unit for storing a standby screen display information table, wherein the standby screen display information table is generated based on a command processing information table comprising behavioral information, collected during a predetermined period, including command type information associated with a time, a day, and a location; and a control unit for detecting that a user's operation signal for the display of the standby screen is input, checking a current location of the mobile terminal and a current time in response to the detection, for identifying standby screen display information corresponding to the current location and the current time in the standby screen display information table, and for displaying the identified standby screen, wherein the command type information comprises a first command type for executing a function of the mobile terminal and a second command type for finishing a function that is currently being executed, and wherein each command type information is identified by a command code that represents a particular type of command, time, and location.

22. The mobile terminal of claim 21, wherein the control unit checks the current time after checking the current location of the mobile terminal.

23. The mobile terminal of claim 21, wherein the location information generator receives location data from a base station of an area in which the mobile terminal is located, and generates the current location information on the mobile terminal using the location data.

24. The mobile terminal of claim 21, wherein the location information generator receives GPS data from GPS satellites, and generates the current location information on the mobile terminal using the GPS data.

25. The mobile terminal of claim 21, wherein the location information generator reads information from a radio frequency identification tag, including location information, installed at a corresponding location, and generates the current location information on mobile terminal using the radio frequency identification tag information.

26. The mobile terminal of claim 21, wherein the control unit detects receiving a user operational input signal for displaying the standby screen, and displays the standby screen according to the user operational input signal.

* * * * *